J. F. CARPMILL & H. G. HANCOCK.
HOOK.
APPLICATION FILED OCT. 4, 1918.
1,299,821.
Patented Apr. 8, 1919.
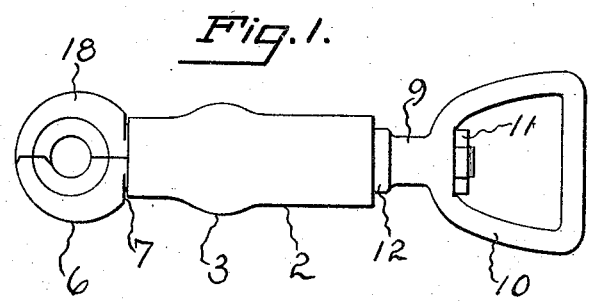
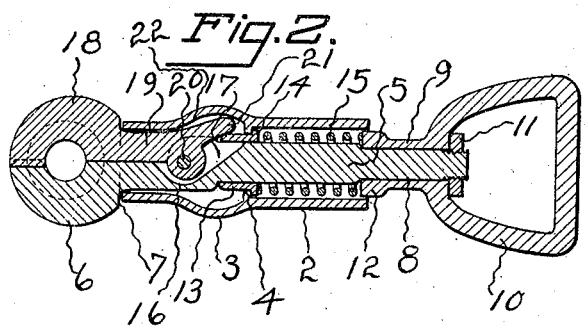
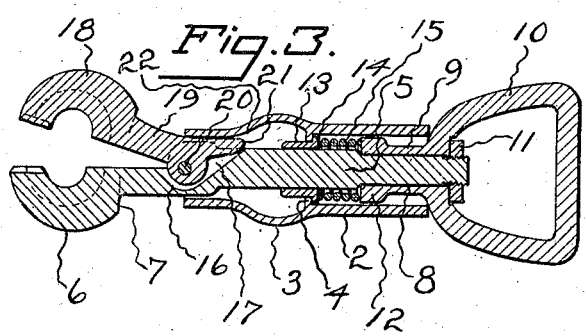

UNITED STATES PATENT OFFICE.

JOHN FRANCIS CARPMILL AND HORACE G. HANCOCK, OF NEW BRITAIN, CONNECTICUT, ASSIGNORS TO THE NORTH & JUDD MANUFACTURING COMPANY, OF NEW BRITAIN, CONNECTICUT, A CORPORATION OF CONNECTICUT.

HOOK.

1,299,821.  Specification of Letters Patent.  Patented Apr. 8, 1919.

Application filed October 4, 1918. Serial No. 256,902.

*To all whom it may concern:*

Be it known that we, JOHN F. CARPMILL and HORACE G. HANCOCK, citizens of the United States, residing at New Britain, in the county of Hartford and State of Connecticut, have invented certain new and useful Improvements in Hooks, of which the following is a specification.

This invention relates to hooks. A hook involving the invention can with advantage be employed in widely-different connections, for illustration in aeroplane construction, harness and various other fields. We have several motives in view, among them being the provision of an article of the character set forth which is strong in construction, simple to make and assemble, and by which the accidental opening of the eye or equivalent element is positively and satisfactorily prevented. The device possesses other features of novelty and advantage which with the foregoing will be set forth at length in the following description wherein we will outline in detail that form of embodiment of the invention which we have selected for illustration in the drawings accompanying and forming part of the present specification, this disclosure being intended to enable those skilled in the art to practise the invention. Obviously we do not restrict ourselves to this description; we may depart therefrom in several respects within the scope of the invention expressed in the claims following said description.

Referring to said drawings:

Figure 1 is a side elevation of a hook involving the invention.

Fig. 2 is a longitudinal section of said hook, the eye being closed as in Fig. 1.
Fig. 3 is a like section but with the eye opened.

Like characters refer to like parts throughout the several views.

The body of the device may within certain limits vary; that shown consists of an elongated sleeve or barrel 2 which may be formed in any desirable manner. This body, sleeve or barrel between its ends is shown as outwardly bulged as at 3. The bulging of said sleeve or barrel in the manner described, secures an external manipulating portion and also an interior operating portion as we will hereinafter explain.

Within the sleeve or barrel 2 at about the rear end of the bulge 3, is an annular flange 4, constituting a suitable stop and functioning in the manner to be set forth later.

Extending entirely through the sleeve or barrel 2 is a shank or stem 5 terminating at its front end in a hook 6 which as represented is in one piece with the said shank or stem. Where the hook unites with the shank there is a shoulder 7 which when the parts are in their normal position as shown for instance in Figs. 1 and 2 abuts against the front end of the sleeve or barrel 2. Said shank or stem 5 near its rear is shown as of reduced diameter as at 8, the reduced portion extending freely through the boss 9 of the shackle or bail 10 and having its rear as represented threaded to receive the nut 11 which abuts against the boss or hub 9 to press the same solidly against the shoulder 12 at the forward end of the reduced portion 8, and at the same time maintain the parts in assembled relation.

The shank or stem 5 as shown has surrounding it between the ends thereof, the sleeve 13. The latter extends through an opening formed by the annular flange 4 to which I have already alluded and which is in turn provided at its rear with an annular flange 14 abutting against said flange 4. It will be observed that the interior of the sleeve or barrel 2 is of two diameters, the rear one being greater than the forward. Within the rear of greater internal diametrical portion of said sleeve or barrel 2 is the coiled spring 15 which engages at its forward or inner end against the flange 14 and at its rear the hub or boss 9 which normally fits within said barrel or sleeve 2. The spring in the present case is of "push" type and acts constantly to maintain the parts in their retracted positions as shown by Fig. 2.

The forward portion of the shank or stem 5 back of the hook or half eye 6, has the channel or groove 16, the rear end of which is deepened as at 17, the front end of the sleeve 13 overlying normally or when the parts are in their initial positions as shown in Fig. 2, the deepened portion of the groove or channel. I might note at this point that although this sleeve has its advantages that its use is not always imperative.

There is complemental to the hook 6, the hook 18, the two constituting when closed as shown in both Figs. 1 and 2 an eye. This second hook 18 has a comparatively short shank or stem 19 which near its rear end is shown pivoted at 20 within the channel or groove 16. Back of the pivot 20 this short shank is bent outwardly at 21 to present a tail-piece which when the parts are retracted overlies the sleeve 13 as shown in Fig. 2. As we have already observed, the spring 15 maintains this normal relation. The quite short shank of the hook 18 abuts against the front end of the longer shank 15 of course normally in view of which circumstance the two hooks at such time present jointly an eye to receive a suitable part. We will later set forth how this eye is opened, but might note at this time that when the two hooks are closed as in said Fig. 2, they are comparatively snugly surrounded by the wall of the smaller or front interior portion of the body, sleeve or barrel 2 which maintains this condition. Obviously the shank 19 at this period fits approximately closely in the front part of the channel or groove 16, and naturally said body, sleeve or barrel 2 positively holds the eye closed.

At about the junction of the interior surface of the bulge 3 and the smaller front interior surface of the body sleeve 2, there is a cam 22. It will of course, be perceived that when the parts are in their retracted positions as shown in said Fig. 2, the tail piece 21 is free of the cam portion or surface 22. To open the eye, the following procedure may be adopted: The shank 5 and body sleeve will be relatively operated for example by sliding the sleeve 2 to the right and the shank 5 to the left in Fig. 2. This will, of course relatively advance the shank 5 and its hook 6 and at the same time advance the shank 19 and its hook 18 and will carry the tail piece 21 against the cam surface 22 and as the motion in question is continued the cam surface will positively swing the shank 19 on its fulcrum to move the hook 18 outwardly and away from the companion hook 6 and thus open the eye, so that a part may be, if desired, connected therewith. When the connection is made the action described is reversed.

What we claim is:

1. A device of the class described comprising two shanks each furnished with a hook, a barrel in which the two shanks are received, provided with means to maintain the hooks closed to form an eye and also provided with cam means for relatively separating the hooks on relative movement of the shanks and the barrel.

2. A device of the class described, comprising two shanks each furnished with a hook, and a barrel in which the two shanks are received, provided with means to maintain the hooks closed to form an eye and also provided with means for positively relatively separating the hooks on relative movement of the shanks and barrel.

3. A device of the class described comprising two shanks, one of which is pivoted to the other, each of the shanks having a hook, a barrel to receive both shanks, one of the shanks extending entirely through the barrel, the barrel being provided with means to normally hold the hooks closed against each other and being provided interiorly with cam means for relatively separating the hooks on relative movement of the shanks and the barrel.

4. A device of the class described comprising a barrel, a shank extending through the barrel and provided with a hook, a hook complemental to the other hook, provided with a shank pivoted to the other shank, the second shank having a tail piece, and the barrel having cam means to operate against the tail piece to separate the hooks on relative movement of the first shank and the barrel.

5. A device of the class described comprising a barrel, a shank extending through the barrel and provided with a hook, a hook complemental to the other hook, provided with a shank pivoted to the other shank, the second shank having a tail piece in the barrel and the barrel having a cam to operate against the tail piece to separate the hooks on relative movement of the first shank and the barrel.

6. A device of the class described comprising a barrel, a shank extending through the barrel and provided with a hook, a hook complemental to the other hook provided with a shank pivoted to the other shank, the second shank having a tail piece in the barrel, the barrel having a cam to operate against the tail piece to separate the hooks on relative movement of the first shank and the barrel, a flanged sleeve in the barrel through which the first shank extends, the barrel having a stop to be abutted by the flange of the sleeve, and a coiled spring around the first shank engaging said flange at one end, the first shank having a part to be engaged by the other end of the sleeve.

In testimony whereof we affix our signatures in the presence of two witnesses.

JOHN FRANCIS CARPMILL.
HORACE G. HANCOCK.

Witnesses as to signature of Carpmill:
L. S. NASH,
G. W. TROOP.

Witnesses as to signature of Hancock:
ED. JAHNSON,
T. B. MONROE.